US012406607B2

(12) United States Patent
Lin et al.

(10) Patent No.: US 12,406,607 B2
(45) Date of Patent: Sep. 2, 2025

(54) PIXEL CIRCUIT

(71) Applicant: AUO Corporation, Hsinchu (TW)

(72) Inventors: Chih-Lung Lin, Tainan (TW); Yi-Jui Chen, Tainan (TW); Jui-Hung Chang, Taichung (TW); Yi-Chien Chen, Tainan (TW); Ming-Yang Deng, Hsinchu (TW); Ming-Hung Chuang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/774,929

(22) Filed: Jul. 17, 2024

(65) Prior Publication Data

US 2025/0029538 A1 Jan. 23, 2025

(30) Foreign Application Priority Data

Jul. 21, 2023 (TW) ................................ 112127431

(51) Int. Cl.
*G09G 3/20* (2006.01)

(52) U.S. Cl.
CPC ... *G09G 3/2003* (2013.01); *G09G 2300/0842* (2013.01); *G09G 2310/0243* (2013.01)

(58) Field of Classification Search
CPC ... G09G 2300/0842; G09G 2310/0243; G09G 3/2003; G09G 3/3233
See application file for complete search history.

(56) References Cited

U.S. PATENT DOCUMENTS 11,723,131 B2 8/2023 Hashimoto
11,967,272 B2 4/2024 Lin et al.
2015/0042692 A1* 2/2015 Kim .................... G09G 3/3233 345/82
2022/0101783 A1* 3/2022 Han ........................ G09G 3/32
2022/0246088 A1* 8/2022 Zhai ........................ G09G 3/32
2022/0330401 A1* 10/2022 Hashimoto .......... G09G 3/3233
2023/0121681 A1* 4/2023 Hwang ................ G09G 3/2014 345/55
2023/0186836 A1* 6/2023 Jeong ...................... G09G 3/32 345/55
2023/0206788 A1* 6/2023 Yang .................... G09F 9/3026 257/79
2023/0230536 A1* 7/2023 Kim .................... G09G 3/3241 345/55
2024/0029630 A1* 1/2024 Lin ...................... G09G 3/2007
2024/0169892 A1* 5/2024 Huo ..................... G09G 3/3233

FOREIGN PATENT DOCUMENTS

CN 115376462 11/2022
TW I749958 12/2021
TW 202241212 10/2022
TW I828337 1/2024
TW I829428 1/2024
TW I830433 1/2024

* cited by examiner

*Primary Examiner* — Kenneth Bukowski
(74) *Attorney, Agent, or Firm* — JCIPRNET

(57) ABSTRACT

Disclosed is a pixel circuit. A pulse width signal generator provides a pulse width signal to a control terminal of a light-emitting control switch on a drive current path of a drive current generator. A multiple lighting controller adjusts the pulse width signal provided by the pulse width signal generator according to a multiple emission control signal to allow a light-emitting element to perform multi-emission.

14 Claims, 4 Drawing Sheets

PIXEL CIRCUIT

CROSS-REFERENCE TO RELATED APPLICATION

This application claims the priority benefit of Taiwan application serial no. 112127431, filed on Jul. 21, 2023. The entirety of the above-mentioned patent application is hereby incorporated by reference herein and made a part of this specification.

BACKGROUND

Technical Field

The present disclosure relates to an electronic device, and in particular to a pixel circuit.

Description of Related Art

In current technical field, pixel circuits are able to control light-emitting elements to emit light in a multi-emission through pulse width modulation technology and pulse amplitude modulation technology, as well as adjust brightness and grayscale. However, generally speaking, pixel circuits normally adopt multiple transistors and capacitor elements. By simplifying the structure of the pixel circuit, it is possible to reduce layout difficulty and decrease power consumption. In addition, in display conditions with low grayscale values, due to the variations in the threshold voltage of the transistor in the pixel circuit, the current that drives the light-emitting element to emit light might not be able to reach the expected current value, resulting in insufficient luminous brightness and uneven brightness, which consequently affect display quality.

SUMMARY

The present disclosure provides a pixel circuit that may effectively simplify the circuit structure of a pixel circuit for multi-emission.

The pixel circuit of the present disclosure includes a light-emitting element, a drive current generator, a pulse width signal generator and a multiple lighting controller. The light-emitting element is coupled to a power supply voltage. The drive current generator is coupled to the light-emitting element and provides a drive current through the drive current path to drive the light-emitting element. The pulse width signal generator provides the pulse width signal to the control terminal of the light-emitting control switch on the drive current path. The multiple lighting controller is coupled between the control terminal of the light-emitting control switch and the drive current generator, and adjusts the pulse width signal according to the multiple emission control signal to allow the light-emitting element to perform multi-emission.

Based on the above, the pulse width signal generator of the present disclosure may provide the pulse width signal to the control terminal of the light-emitting control switch on the drive current path of the drive current generator, and the multiple lighting controller may adjust the pulse width signal provided by the pulse width signal generator according to the multiple emission control signal to allow the light-emitting element to perform multi-emission. In this way, the multiple lighting controller is utilized to adjust the pulse width signal provided by the pulse width signal generator according to the multiple emission control signal to allow the light-emitting element to perform multi-emission, which may effectively simplify the circuit structure of the pixel circuit for multi-emission and reduce the number of switches on the drive current path, thereby decreasing power consumption.

DESCRIPTION OF THE EMBODIMENTS

Figure 1:
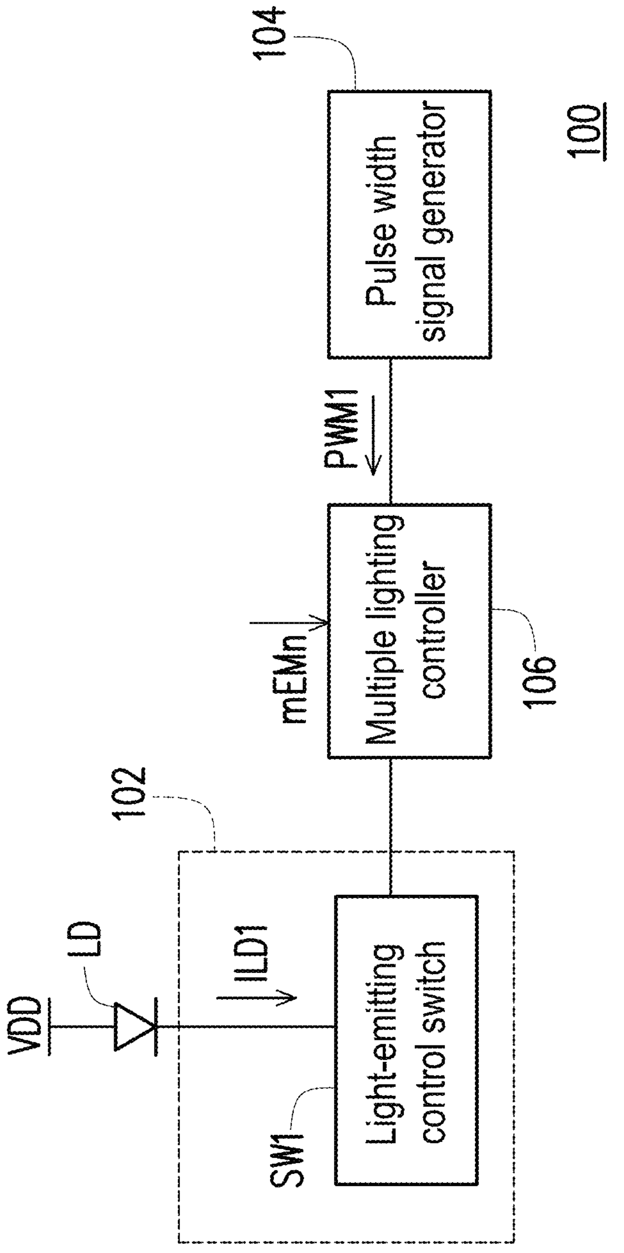
FIG. 1 is a schematic diagram of a pixel circuit according to an embodiment of the present disclosure.

Please refer to FIG. 1, which is a schematic diagram of a pixel circuit according to an embodiment of the present disclosure. A pixel circuit 100 includes a light-emitting element LD, a drive current generator 102, a pulse width signal generator 104 and a multiple lighting controller 106. The light-emitting element LD may be, for example, a light-emitting diode having an anode coupled to a power supply voltage VDD, a cathode of the light-emitting element LD is coupled to the drive current generator 102, and the multiple lighting controller 106 is coupled to the drive current generator 102 and the pulse width signal generator 104.

The drive current generator 102 may provide the drive current ILD1 to drive the light-emitting element LD through the drive current path. A light-emitting control switch SW1 is disposed on the drive current path. The pulse width signal generator 104 may provide the pulse width signal PWM1 to the control terminal of the light-emitting control switch SW1 on the drive current path through the multiple lighting controller 106 to control the light-emitting element LD to emit light. In addition, the multiple lighting controller 106 may adjust the pulse width signal PWM1 according to the multiple emission control signal mEMn to allow the light-emitting element LD to perform multi-emission.

In this way, the multiple lighting controller 106 is utilized to adjust the pulse width signal PWM1 provided by the pulse width signal generator 104 according to the multiple emission control signal mEMn to allow the light-emitting element LD to perform multi-emission. Accordingly, it is possible to effectively simplify the circuit structure of the pixel circuit 100 for multi-emission, reduce the number of switches on the drive current path, thereby decreasing power consumption.

Figure 2:
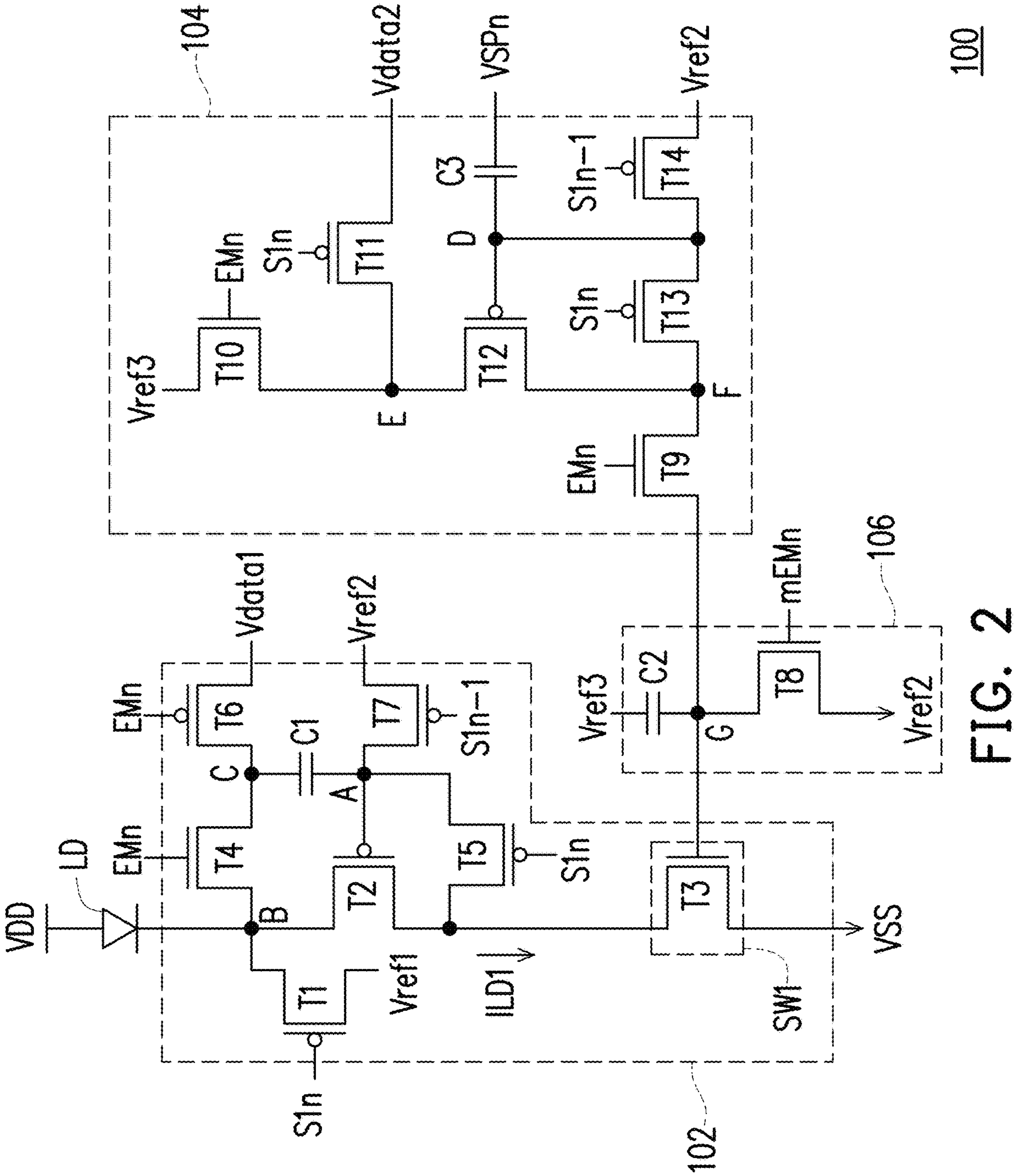
FIG. 2 is a schematic diagram of a pixel circuit according to another embodiment of the present disclosure.

Furthermore, the implementation of the pixel circuit 100 may be shown in FIG. 2. In the embodiment of FIG. 2, the drive current generator 102 includes transistors T1 to T7 and a capacitor C1, wherein the transistor T3 is configured for implementation of the light-emitting control switch SW1. The transistor T1 is coupled between the cathode of the light-emitting element LD and the reference voltage Vref1, the transistors T2 and T3 are connected in series between the cathode of the light-emitting element LD and the reference ground voltage VSS, and the transistors T4 and T6 are connected in series between the cathode of the light-emitting element LD and the data voltage Vdata1, wherein the data voltage Vdata1 is configured to determine the current magnitude of the drive current ILD1. The capacitor C1 is coupled between the common junction of transistors T4 and T6 and the control terminal of the transistor T2. The transistor T5 is coupled between the common junction of the transistors T2 and T3 and the control terminal of the transistor T2. The transistor T7 is coupled between the control terminal of the transistor T2 and the reference voltage Vref2. The multiple lighting controller 106 may include a transistor T8 and a capacitor C2. The transistor T8 is coupled between the control terminal of the transistor T3 and the reference voltage Vref2. The capacitor C2 is coupled between the control terminal of the transistor T3 and the reference voltage Vref3.

In addition, the pulse width signal generator 104 may include transistors T9 to T14 and a capacitor C3, wherein the first terminal of the transistor T9 is coupled to the control terminal of the transistor T3, and the transistor T10 and the transistor T12 are connected in series between the reference voltage Vref3 and the second terminal of the transistor T9. The transistor T11 is coupled between the common junction of the transistors T10 and T12 and the data voltage Vdata2, wherein the data voltage Vdata2 is utilized to determine the pulse width of the pulse width signal PWM1 provided by the pulse width signal generator 104. The capacitor C3 is coupled between the control terminal of the transistor T12 and the sweep voltage VSPn. The transistors T13 and T14 are coupled between the second terminal of the transistor T9 and the reference voltage Vref2. The common junction of the transistors T13 and T14 are coupled to the control terminal of the transistor T12.

Figure 3:
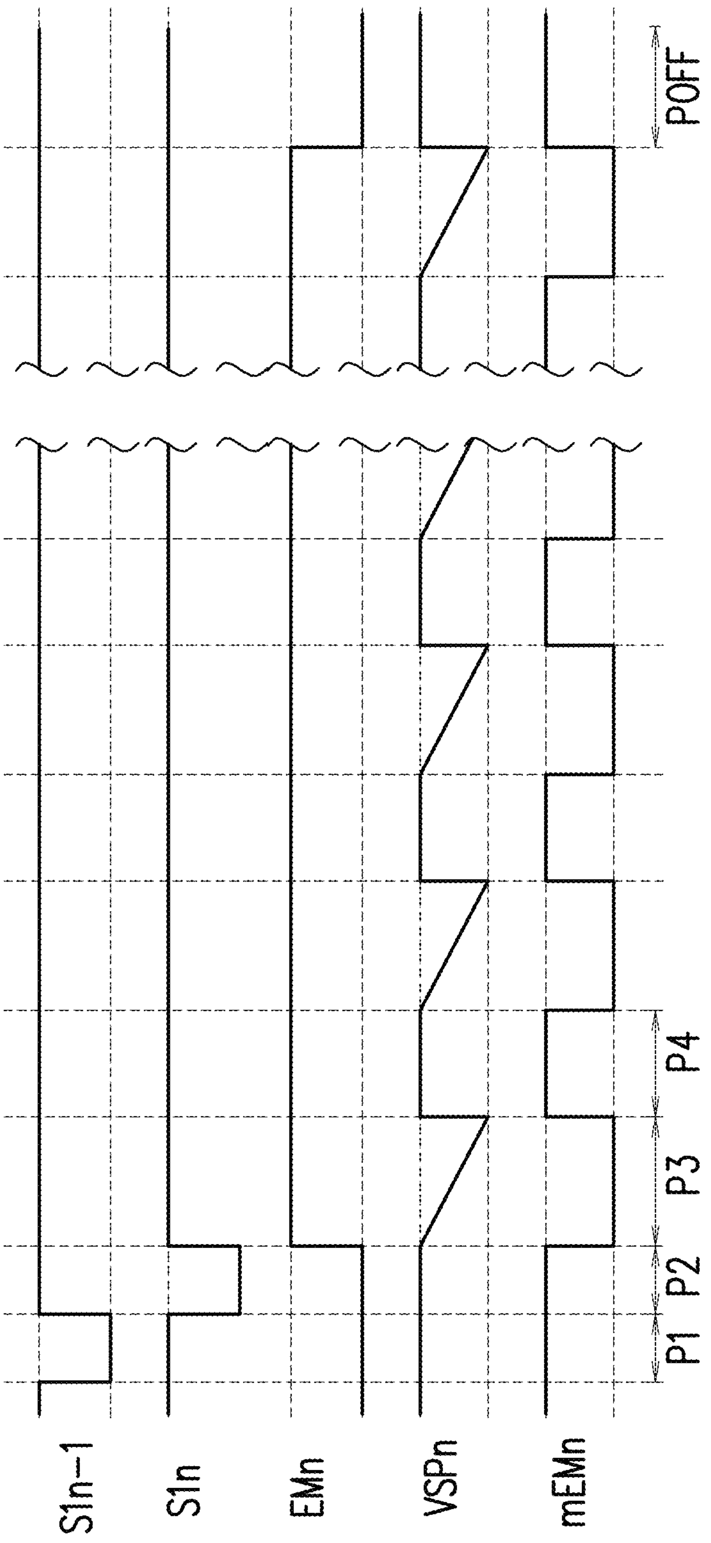
FIG. 3 shows an operation waveform diagram of a pixel circuit according to an embodiment of the present disclosure.

The operation waveform of the pixel circuit 100 in the embodiment of FIG. 2 may be as shown in FIG. 3, for example. During the reset period P1, the transistors T7 and T14 are turned on under the control of the previous-stage scan signal S1*n*-1, the transistors T1, T5, T11, and T13 are turned off under the control of the scan signal S1*n*, the transistors T4, T9 and T10 are turned off under the control of the emission control signal EMn, the transistor T6 is turned on under the control of the emission control signal EMn, and the transistor T8 is turned on under the control of the multiple emission control signal mEMn. In addition, the transistor T2 is turned on (conducted) by the reference voltage Vref2 due to the conduction of the transistor T7, the transistor T3 is turned off (disconnected) by the reference voltage Vref2 due to the conduction of the transistor T8, and the transistor T12 is turned on by the reference voltage Vref2 due to the conduction of the transistor T14. Therefore, during the reset period P1, the voltages VA, VD, and VG of nodes A, D, and G shown in FIG. 2 are equal to the reference voltage Vref2, and the voltage VB of node B is equal to the power supply voltage VDD minus the cross voltage on the light-emitting element LD. The voltage VC of the node C is equal to the data voltage Vdata1, and the voltages VE and VF of the nodes E and F are equal to the reference voltage Vref3. In this embodiment, the relationship between the magnitudes of voltages is data voltage Vdata1>reference voltage Vref1>power supply voltage VDD>reference voltage Vref2>reference ground voltage VSS>reference voltage Vref3.

During the compensation and data input period P2, the previous-stage scan signal S1*n*-1 changes from a low voltage level to a high voltage level, the scan signal S1*n* changes from a high voltage level to a low voltage level. Accordingly, the transistors T7 and T14 change from conduction to disconnection, and the transistors T1, T5, T11, and T13 change from disconnection to conduction. Under the circumstances, the voltage VA of the node A shown in FIG. 2 is equal to the reference voltage Vref1 minus the threshold voltage VTH2 of the transistor T2, the voltage VB of the node B is equal to the reference voltage Vref1, the voltage VC of the node C is equal to the data voltage Vdata1, the voltages VD and VF of the nodes D and F are equal to the data voltage Vdata2 minus the threshold voltage VTH12 of the transistor T12, the voltage VE of the node E is equal to the data voltage Vdata2, and the voltage VG of the node G is equal to the reference voltage Vref2.

During the light-emission period P3, the emission control signal EMn changes from a low voltage level to a high voltage level, the multiple emission control signal mEMn changes from a high voltage level to a low voltage level, and the sweep voltage VSPn gradually changes from a high voltage level to a low voltage level. Therefore, the transistors T4, T9, and T10 change from disconnection to conduction, the transistor T6 changes from conduction to disconnection, the transistor T8 changes from conduction to disconnection, and the transistor T12 changes from disconnection to conduction. Under the circumstances, the voltage VA of the node A shown in FIG. 2 is equal to the reference voltage Vref1 minus the threshold voltage VTH2 of the transistor T2, the voltages VB and VC of the nodes B and C are equal to the data voltage Vdata1, and the voltage VD of the node D is equal to the data voltage Vdata2 minus the threshold voltage VTH12 of the transistor T2 and the voltage difference ΔV caused by the drop of the sweep voltage VSPn, that is, Vdata2–VTH12–ΔV. The voltage VE of the node E is equal to the reference voltage Vref3, and the voltages VF and VG of the nodes F and G are equal to the reference voltage Vref2. The condition for the transistor T12 to be turned on is VE–VD>VTH12, which may be expressed as Vref2–(Vdata2–VTH12–ΔV)>VTH12, that is, Vref2–Vdata2+ΔV>0. It may be seen that the conduction condition of the transistor T12 is irrelevant to the threshold voltage VTH12 of the transistor T12. Therefore, it is possible to effectively prevent the variation of the threshold voltage VTH12 of the transistor T12 from affecting the brightness of the light-emitting element LD, and the grayscale accuracy may be increased. Under low grayscale display conditions, there will be no insufficient light brightness or uneven brightness, and the display quality may be improved significantly.

In addition, during the light-emission period P3, when the sweep voltage VSPn decreases and the transistor T12 is turned on, the transistor T3 will be turned on by the reference voltage Vref3 as the transistor T12 is turned on. Under the circumstances, the voltages VF and VG of the nodes F and G are changed to the reference voltage Vref3, the voltages VB and VC of the nodes B and C are equal to VDD-VLD, and the voltage VA of the node A is equal to VDD-VLD-Vdata1+Vref1–VTH2. Therefore, the drive current ILD1 may be expressed as:

Equation (1)

$$1/2k(VB - VA - VTH2)^2 = 1/2k(VDD - VLD - VDD + VLED + Vref1 + Vdata1 + VTH2 - VTH2)^2 = 1/2k(Vdata1 - Vref1)^2$$

That is to say, the drive current ILD1 will not be affected by the voltage drop (VDD I-R drop) of the power supply voltage VDD and the variation of the threshold voltage VTH2 of the transistor T2, thereby improving the uniformity of the drive current ILD1 and enhancing the display quality. In addition, the embodiment uses only 14 transistors and 3 capacitors, which has a simpler structure than the related art, so it is possible to reduce layout difficulty. Only two transistors T2 and T3 are included in the drive current path with the drive current ILD1, so it is possible to effectively reduce power consumption.

During the stable period P4, the multiple emission control signal mEMn changes from a low voltage level to a high voltage level, and the sweep voltage VSPn changes from a low voltage level to a high voltage level. The transistor T8 therefore switches from disconnection to conduction, causing the transistor T3 to turn off. Under the circumstances, the voltages VF and VG of the nodes F and G are changed to the reference voltage Vref2. In addition, the transistor T12 is changed to disconnection in response to the change of the sweep voltage VSPn.

In addition, during the off period POFF, the transistors T7 and T14 are turn off under the control of the previous-stage scan signal S1*n*-1, the transistors T1, T5, T11, and T13 are turn off under the control of the scan signal S1*n*, the transistors T4, T9 and T10 are turn off under the control of the emission control signal EMn, the transistor T6 is turned on under the control of the emission control signal EMn, and the transistor T8 is turned on under the control of the multiple emission control signal mEMn. In addition, the transistor T2 is turned off (disconnected) by the reference voltage Vref1 due to the conduction of the transistor T6, the transistor T3 is turned off (disconnected) by the reference voltage Vref2 due to the conduction of the transistor T8, and the transistor T12 is turned off due to the disconnection of the transistor T14.

During the off period POFF, the voltage VA of the node A shown in FIG. 2 is equal to the reference voltage Vref1 minus the threshold voltage VTH2 of the transistor T2, the voltage VB of the node B is equal to the power supply voltage VDD minus the cross voltage VLD on the light-emitting element LD, the voltage VC the of node C is equal to the data voltage Vdata1, the voltage VD of the node D is equal to the data voltage Vdata2 minus the threshold voltage VTH12 of the transistor T12, the voltages VE and VF of the nodes E and F are equal to the reference voltage Vref3, and the voltage VG of the node G is equal to the reference voltage Vref2.

Figure 4:
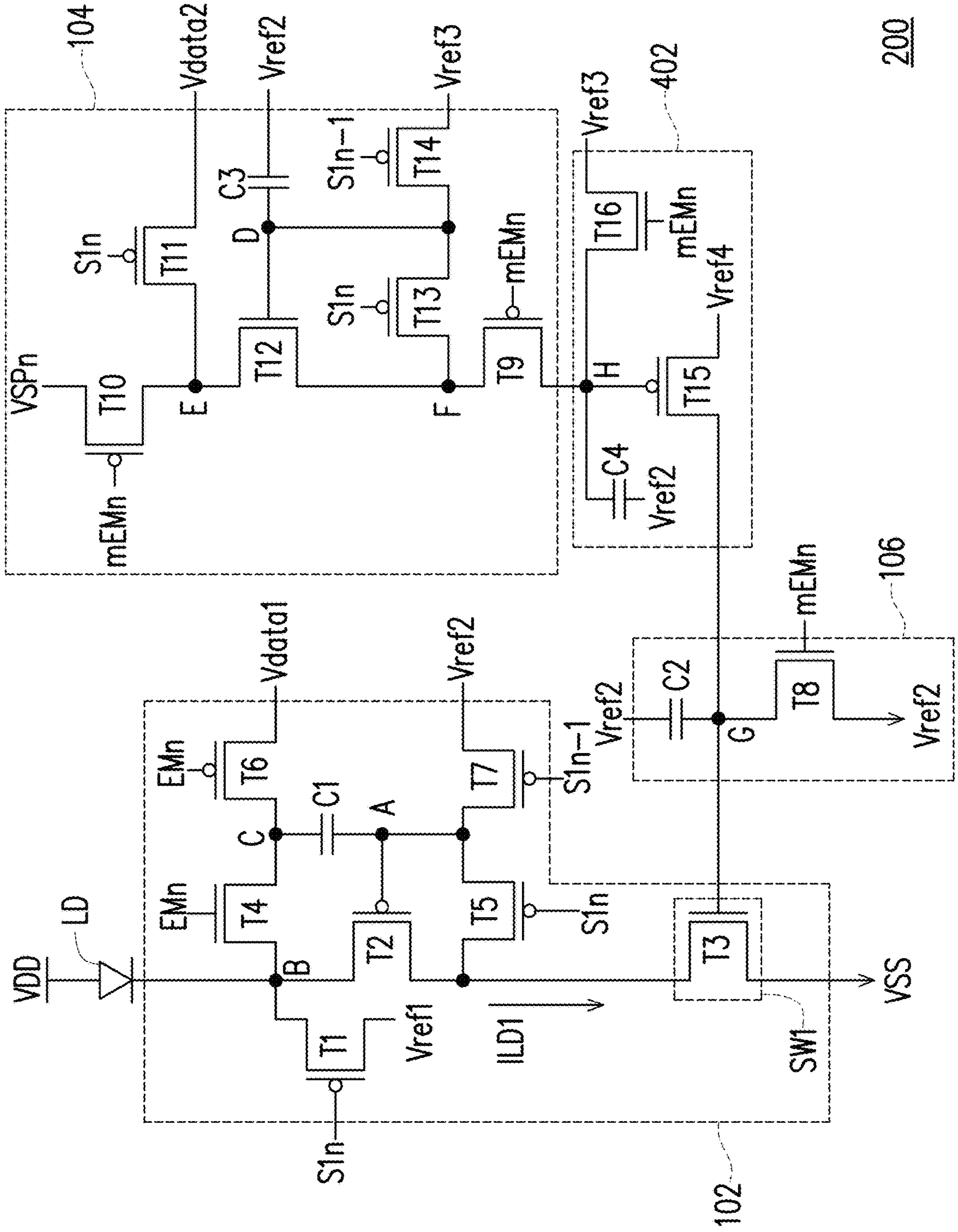
FIG. 4 is a schematic diagram of a pixel circuit according to another embodiment of the present disclosure.

FIG. 4 is a schematic diagram of a pixel circuit according to another embodiment of the present disclosure. Compared with the embodiments of FIG. 1 and FIG. 2, this embodiment further includes an activation accelerator 402, which is coupled between the pulse width signal generator 104 and the multiple lighting controller 106. The activation accelerator 402 may accelerate the conduction speed of the light-emitting control switch SW1 according to the pulse width signal PWM1 provided by the pulse width signal generator 104. As shown in FIG. 4, the activation accelerator 402 may include the transistors T15 and T16 and the capacitor C3. The transistor T15 is coupled between the control terminal of the transistor T3 and the reference voltage Vref4. The control terminal of the transistor T15 is coupled to one end of the transistor T9 (the output terminal of the pulse width signal generator 104), the transistor T16 is coupled between the control terminal of the transistor T15 and the reference voltage Vref3, the control terminal of the transistor T15 receives the multiple emission control signal mEMn, and the capacitor C4 is coupled between the control terminal of the transistor T15 and the reference voltage Vref2.

Additionally, compared with the embodiment of FIG. 2, the capacitor C2 of this embodiment is changed to be coupled to the reference voltage Vref2, the transistor T10 is changed to be coupled to the sweep voltage VSPn, the control terminal of the transistor T10 is changed to receive the multiple emission control signal mEMn, the capacitor C2 is changed to be coupled to the reference voltage Vref2, the transistor T14 is changed to be coupled to the reference voltage Vref3, and the control terminal of the transistor T9 is changed to receive the multiple emission control signal mEMn. In addition, unlike the embodiment of FIG. 2, in the embodiment of FIG. 4, the transistors T9, T10, and T12 are implemented as P-type transistors. Moreover, in the embodiment of FIG. 4, the relationship between voltage magnitudes is reference voltage Vref3>data voltage Vdata1>reference voltage Vref4>power supply voltage VDD>reference voltage Vref1>reference ground voltage VSS>reference voltage Vref2.

The pixel circuit 200 in the embodiment of FIG. 4 also adopts the operation waveform diagram shown in FIG. 2. During the reset period P1, the transistors T7 and T14 are turned on under the control of the previous-stage scan signal S1*n*−1, the transistors T1, T5, T11, and T13 are turned off under the control of the scan signal SIn, the transistor T4 is turned off under the control of the emission control signal EMn, the transistor T6 is turned on under the control of the emission control signal EMn, the transistors T8 and T16 are turned on under the control of the multiple emission control signal mEMn, and the transistors T9 and T10 are turned off under the control of the multiple emission control signal mEMn. Furthermore, the transistor T2 is turned on (conducted) by the reference voltage Vref2 due to the conduction of the transistor T7, the transistor T3 is turned off (disconnected) by the reference voltage Vref2 due to the conduction of the transistor T8, the transistor T12 is turned on by the reference voltage Vref3 due to the conduction of the transistor T14, and the transistor T15 is turned off by the reference voltage Vref3 due to the conduction of the transistor T16. Therefore, during the reset period P1, the voltages VA and VG of the nodes A and G shown in FIG. 2 are equal to the reference voltage Vref2, the voltage VB of the node B is equal to the power supply voltage VDD minus the cross voltage VLD on the light-emitting element LD, the voltage VC of the node D is equal to the data voltage Vdata1, the voltages VD and VH of the nodes D and H are equal to the reference voltage Vref3, and the voltages VE and VF of the nodes E and F are equal to the sweep voltage VSPn.

During the compensation and data input period P2, the previous-stage scan signal S1*n*-1 is changed from a low voltage level to a high voltage level, the scan signal S1*n* is changed from a high voltage level to a low voltage level, and accordingly the transistors T7 and T14 are changed from conduction to disconnection, and the transistors T1, T5, T11, and T13 are changed from disconnection to conduction. Under the circumstances, the voltage VA of the node A shown in FIG. 2 is equal to the reference voltage Vref1 minus the threshold voltage VTH2 of the transistor T2, the voltage VB of the node B is equal to the reference voltage Vref1, the voltage VC of the node C is equal to the data voltage Vdata1, the voltages VD and VF of the nodes D and F are equal to the data voltage Vdata2 plus the threshold voltage VTH12 of the transistor T12, the voltage VE of the node E is equal to the data voltage Vdata2, the voltage VG of the node G is equal to the reference voltage Vref2, and the voltage VH of the node H is equal to the reference voltage Vref3.

During the light-emission period P3, the multiple emission control signal mEMn is changed from a low voltage level to a high voltage level, the emission control signal EMn is changed from a high voltage level to a low voltage level, and the sweep voltage VSPn is gradually changed from a high voltage level to a low voltage level. Therefore, the transistor T4 is changed from disconnection to conduction, the transistor T6 is changed from conduction to disconnection, the transistors T8 and T16 are changed from conduction to disconnection, the transistors T9 and T10 are changed from disconnection to conduction, and the transistor T12 is changed from disconnection to conduction. Under the circumstances, the voltage VA of the node A shown in FIG. 2 is equal to the reference voltage Vref1 minus the threshold voltage VTH2 of the transistor T2, the voltages VB and VC of the nodes B and C are equal to the data voltage Vdata1, the voltage VD of the node D is equal to the data voltage Vdata2 plus the threshold voltage VTH12 of the transistor T12, the voltage VE of the node E is equal to the voltage VSPH (when the sweep voltage VSPn is at the high voltage level) minus the voltage difference ΔV caused by the drop of the sweep voltage VSPn, that is, VSPH−ΔV, the voltages VF and VH of the nodes F and H are equal to the reference voltage Vref3, and the voltage VG of the node G is equal to the reference voltage Vref2. The condition for the transistor T12 to be turned on is VD−VE>VTH12, which may be expressed as Vdata2+VTH12−(VSPH−ΔV)>VTH12, that is, Vdata2−VSPH+ΔV>0. It may be seen that the condition for the transistor T12 to be turned on is irrelevant to the threshold voltage VTH12 of the transistor T12. Therefore, it is possible to effectively prevent the variation of the threshold voltage VTH12 of the transistor T12 from affecting the brightness of the light-emitting element LD, and the grayscale accuracy may be increased. Under low grayscale display conditions, there will be no insufficient light brightness or uneven brightness, thereby significantly improving the display quality.

In addition, during the light-emission period P3, when the sweep voltage VSPn decreases and the transistor T12 is turned on, the transistor T15 will be turned on by the sweep voltage VSPn as the transistor T12 is turned on. The conduction of the transistor T15 may further cause the transistor T3 to be quickly turned on by the reference voltage Vref4. Under the circumstances, the voltage VG of the node G is changed to the reference voltage Vref4, the voltages VB and VC of the nodes B and C are equal to VDD−VLD, the voltage VD of the node D is equal to Vdata2+VTH12, the voltages VE, VF and VH of the nodes E, F and H are equal to VSPH−ΔV, and the voltage VA of the node A is equal to VDD−VLD−Vdata1+Vref1−VTH2. Therefore, the drive current ILD1 may be expressed as the result shown in the above Equation (1), that is, $\frac{1}{2}k(\mathrm{Vdata1}-\mathrm{Vref1})^2$.

That is to say, the drive current ILD1 will not be affected by the voltage drop of the power supply voltage VDD and the variation of the threshold voltage VTH2 of the transistor T2, and the uniformity of the drive current ILD1 may be improved to enhance the display quality. In addition, this embodiment provides the reference voltage Vref4 to the control terminal of the transistor T3 through the activation accelerator 402, which may effectively accelerate the activation of the transistor T3, improve the grayscale control accuracy, and further optimize the display effect of the pixel circuit 200.

During the stable period P4, the multiple emission control signal mEMn is changed from a low voltage level to a high voltage level, and the sweep voltage VSPn is changed from a low voltage level to a high voltage level. Accordingly, the transistor T9 switches from conduction to disconnection, and the transistors T8 and T16 switch from disconnection to conduction, thereby causing the transistor T3 to disconnect. Under the circumstances, the voltages VE and VH of the nodes E and H are respectively changed to the voltage VSPH (when the sweep voltage VSPn is at the high voltage level) and the reference voltage Vref3. Moreover, the transistor T12 is changed to disconnection in response to the change of the sweep voltage VSPn.

During the off period POFF, the transistors T7 and T14 are turned off under the control of the previous-stage scan signal S1*n*-1, the transistors T1, T5, T11, and T13 are turned off under the control of the scan signal SIn, the transistor T4 is turned off under the control of the emission control signal EMn, the transistor T6 is turned on under the control of the emission control signal EMn, and the transistors T8 and T16 are turned on under the control of the multiple emission control signal mEMn. Additionally, the transistor T2 is turned off (disconnected) by the reference voltage Vref1 due to the conduction of the transistor T6, the transistor T3 is turned off (disconnected) by the reference voltage Vref2 due to the conduction of the transistor T8, and the transistor T12 is turned off due to the disconnection of the transistor T14.

During the off period POFF, the voltage VA of the node A shown in FIG. 4 is equal to the reference voltage Vref1 minus the threshold voltage VTH2 of the transistor T2, the voltage VB of the node B is equal to the power supply voltage VDD minus the cross voltage on the light-emitting element LD, the voltage VC of the node C is equal to the data voltage Vdata1, the voltage VD of the node D is equal to the data voltage Vdata2 plus the threshold voltage VTH12 of transistor T12, the voltage VE of the node E is the voltage VSPH (when the sweep voltage VSPn is at the high voltage level), the voltage VF of the node F is equal to the voltage VSPH (when the sweep voltage VSPn is at the high voltage level) minus the voltage difference ΔV caused by the drop of the sweep voltage VSPn, the voltage VG of the node G is equal to the reference voltage Vref2, and the voltage VG of the node H is equal to the reference voltage Vref3.

In summary, the pulse width signal generator of the present disclosure may provide a pulse width signal to the control terminal of the light-emitting control switch on the drive current path of the drive current generator, and the multiple lighting controller may adjust the pulse width signal provided by the pulse width signal generator according to the multiple emission control signal to allow the light-emitting element to perform multi-emission. In this way, the multiple lighting controller is utilized to adjust the pulse width signal provided by the pulse width signal generator according to the multiple emission control signal to allow the light-emitting element to perform multi-emission, which may effectively simplify the circuit structure of the pixel circuit for multi-emission and reduce the number of switches on the drive current path, thereby decreasing power consumption. In some embodiments, an activation accelerator may also be used to accelerate the conduction speed of the light-emitting control switch to improve grayscale control accuracy and further optimize the display effect of the pixel circuit.

What is claimed is:

1. A pixel circuit, comprising:
- a light-emitting element, coupled to a power supply voltage;
- a drive current generating circuitry, coupled to the light-emitting element and providing a drive current through a drive current path to drive the light-emitting element;
- a pulse width signal generating circuitry, providing a pulse width signal to a control terminal of a light-emitting control switch on the drive current path; and
- a multiple lighting controlling circuitry, coupled between the control terminal of the light-emitting control switch and the drive current generating circuitry, and adjusting the pulse width signal according to a multiple emission control signal to allow the light-emitting element to perform multi-emission, wherein the drive current generating circuitry comprises:

a first transistor, coupled between the light-emitting element and a first reference voltage, wherein a control terminal of the first transistor receives a scan signal;

a second transistor, connected in series with the light-emitting control switch between the light-emitting element and a reference ground voltage, wherein the light-emitting control switch is a third transistor;

a fourth transistor, one end thereof being coupled to the light-emitting element, wherein a control terminal of the fourth transistor receives an emission control signal;

a fifth transistor, coupled between one end of the second transistor and a control terminal of the second transistor, wherein a control terminal of the fifth transistor receives the scan signal;

a sixth transistor, connected in series with the fourth transistor between another end of the second transistor and a first data voltage, wherein a control terminal of the sixth transistor receives the emission control signal;

a first capacitor, coupled between a common junction of the fourth transistor and the sixth transistor and the control terminal of the second transistor; and a seventh transistor, coupled between the control terminal of the second transistor and a second reference voltage, wherein a control terminal of the seventh transistor receives a previous-stage scan signal.

2. The pixel circuit according to claim 1, wherein during a compensation and data input period, the first transistor and the fifth transistor are turned on under a control of the scan signal, the fourth transistor is turned off under a control of the emission control signal, the sixth transistor is turned on under the control of the emission control signal, the seventh transistor is turned on under a control of the previous-stage scan signal, the third transistor is turned off under a control of the pulse width signal adjusted by the multiple lighting controlling circuitry, and the second transistor is in a conductive state.

3. The pixel circuit according to claim 1, wherein the multiple lighting controlling circuitry comprises:

a second capacitor, coupled between the control terminal of the light-emitting control switch and a third reference voltage; and an eighth transistor, coupled between the control terminal of the light-emitting control switch and the second reference voltage, wherein a control terminal of the eighth transistor receives the multiple emission control signal.

4. He pixel circuit according to claim 3, wherein the pulse width signal generating circuitry comprises:

a ninth transistor, one end thereof being coupled to the control terminal of the light-emitting control switch, wherein a control terminal of the ninth transistor receives the emission control signal;

a tenth transistor, one end thereof being coupled to the third reference voltage, wherein a control terminal of the tenth transistor receives the emission control signal;

an eleventh transistor, coupled between another end of the tenth transistor and a second data voltage, wherein a control terminal of the eleventh transistor receives the scan signal;

a twelfth transistor, coupled between the another end of the tenth transistor and another end of the ninth transistor;

a third capacitor, coupled between a control terminal of the twelfth transistor and a sweep voltage;

a thirteenth transistor, coupled between the another end of the ninth transistor and the control terminal of the twelfth transistor, wherein a control terminal of the thirteenth transistor receives the scan signal; and a fourteenth transistor, coupled between the control terminal of the twelfth transistor and the second reference voltage, wherein a control terminal of the fourteenth transistor receives the previous-stage scan signal.

5. He pixel circuit according to claim 4, wherein during a compensation and data input period, the ninth transistor and the tenth transistor are turned off under a control of the emission control signal, the fourteenth transistor is turned off under a control of the previous-stage scan signal, the eleventh transistor and the thirteenth transistor are turned on under a control of the scan signal, and the twelfth transistor is in a conductive state.

6. The pixel circuit according to claim 4, wherein in a light-emission period, the first transistor, the fifth transistor, the eleventh transistor and the thirteenth transistor are turned off under a control of the scan signal, the eighth transistor is turned off under a control of the multiple emission control signal, the fourth transistor, the ninth transistor and the tenth transistor are turned on under the control of the emission control signal, the sixth transistor is turned off under the control of the emission control signal, the seventh transistor and the fourteenth transistor are turned off under a control of the previous-stage scan signal, the second transistor is in a conductive state, and the twelfth transistor is changed from a disconnected state to the conductive state under a control of the sweep voltage to allow the third transistor to be changed from the disconnected state to the conductive state.

7. The pixel circuit according to claim 4, wherein the second data voltage>the first reference voltage>the power supply voltage>the second reference voltage>the reference ground voltage>the third reference voltage.

8. The pixel circuit according to claim 1, further comprising:

an activation accelerator, coupled to the pulse width signal generating circuitry and the multiple lighting controlling circuitry, and accelerating a conduction speed of the light-emitting control switch according to the pulse width signal.

9. The pixel circuit according to claim 8, wherein the multiple lighting controlling circuitry comprises:

a second capacitor, coupled between the control terminal of the light-emitting control switch and the second reference voltage; and an eighth transistor, coupled between the control terminal of the light-emitting control switch and the second reference voltage, wherein a control terminal of the eighth transistor receives the multiple emission control signal.

10. The pixel circuit according to claim 9, wherein the pulse width signal generating circuitry comprises:

a ninth transistor, one end thereof being coupled to the activation accelerator, wherein a control terminal of the ninth transistor receives the multiple emission control signal;

a tenth transistor, one end thereof being coupled to a sweep voltage, wherein a control terminal of the tenth transistor receives the multiple emission control signal;

an eleventh transistor, coupled between another end of the tenth transistor and a second data voltage, wherein a control terminal of the eleventh transistor receives the scan signal;

a twelfth transistor, coupled between the another end of the tenth transistor and another end of the ninth transistor;

a third capacitor coupled between a control terminal of the twelfth transistor and the second reference voltage;

a thirteenth transistor, coupled between the another end of the ninth transistor and a control terminal of the twelfth transistor, wherein a control terminal of the thirteenth transistor receives the scan signal; and a fourteenth transistor, coupled between the control terminal of the twelfth transistor and a third reference voltage, wherein a control terminal of the fourteenth transistor receives the previous-stage scan signal.

11. The pixel circuit according to claim 10, wherein during a compensation and data input period, the ninth transistor and the tenth transistor are turned off under a control of the multiple emission control signal, the fourteenth transistor is turned off under a control of the previous-stage scan signal, the eleventh transistor and the thirteenth transistor are turned on under a control of the scan signal, and the twelfth transistor is in a conductive state.

12. The pixel circuit according to claim 10, wherein the activation accelerator comprises:

a fifteenth transistor, coupled between a control terminal of the third transistor and a fourth reference voltage, wherein a control terminal of the fifteenth transistor is coupled to the another end of the ninth transistor;

a fourth capacitor, coupled between the control terminal of the fifteenth transistor and the second reference voltage; and a sixteenth transistor, coupled between the control terminal of the fifteenth transistor and the third reference voltage, wherein a control terminal of the sixteenth transistor receives the multiple emission control signal.

13. The pixel circuit according to claim 12, wherein during a light-emission period, the first transistor, the fifth transistor, the eleventh transistor and the thirteenth transistor are turned off under a control of the scan signal, the eighth transistor and the sixteenth transistor are turned off under a control of the multiple emission control signal, the fourth transistor is turned on under the control of the emission control signal, the ninth transistor and the tenth transistor are turned on under the control of the multiple emission control signal, the sixth transistor is turned off under the control of the emission control signal, the seventh transistor and the fourteenth transistor are turned off under a control of the previous-stage scan signal, the second transistor is in a conductive state, the twelfth transistor and the fifteenth transistor are changed from a disconnected state to the conductive state under a control of the sweep voltage to allow the third transistor to be changed from the disconnected state to the conductive state.

14. The pixel circuit according to claim 12, wherein the third reference voltage>the second data voltage>the fourth reference voltage>the power supply voltage>the first reference voltage>the reference ground voltage>the second reference voltage.

* * * * *